Patented Jan. 12, 1937

2,067,237

UNITED STATES PATENT OFFICE 2,067,237

MANUFACTURE OF AROMATIC ALDEHYDES

Leonard Eric Hinkel, Swansea, Glamorgan, Wales, assignor to Imperial Chemical Industries Limited, a corporation of Great Britain No Drawing. Application February 8, 1933, Serial No. 655,860. In Great Britain February 15, 1932

8 Claims. (Cl. 260—136)

This invention relates to aromatic aldehydes, more particularly aldehydes having the —CHO group directly united with a phenyl nucleus, and a process for the manufacture thereof.

In British specification No. 19,204 of 1897, there is described a process for producing aromatic aldehydes which process consists in first, allowing hydrochloric and hydrocyanic acid (or salts of the latter), or the completed double compound of hydrochloric and hydrocyanic acid, to act in the presence of aluminum chloride on aromatic hydrocarbons, phenolic ethers, or the like bodies, and secondly splitting up the aldimines thus obtained by means of acids. According to the examples given, dry gaseous hydrocyanic and hydrochloric acids are passed into anisole or toluene at 35° C. to 40° C.

The hydrochloric and hydrocyanic acids are fed in simultaneously, sometimes even in the form of an addition compound known as the chloride of imidoformic acid.

Although it is said in the specification that other aromatic hydrocarbons may be treated, yet it is known (Gattermann and others, Berichte der deutschen chemischen Gesellschaft, 1898, 31, 1149, 1766) that not only does benzene not react with hydrocyanic and hydrochloric acids in the presence of aluminum chloride, but that it can even be used as a solvent in treating other compounds. This inertness of benzene has become generally recognized (cf. Neichstein, Helvetica Chimica Acts, 1930, 13, 352).

Gattermann, in Berichte vol. 31, page 1766, describes a different process wherein the requisite hydrocyanic acid is first mixed cold with a mixture of the aromatic compound to be converted, a solvent, and aluminum chloride. Hydrochloric acid gas is then passed in, while the mixture is being warmed up to 40° C.

In the same article, page 1768, Gattermann describes a third variant in procedure, according to which a mixture of the aromatic compound, the solvent, and hydrocyanic acid is first saturated with hydrochloric acid and then the requisite aluminum chloride is gradually fed in.

As in the case of the British patent above mentioned, benzene was found relatively inert toward the reaction, and was for that reason selected as the solvent.

It is an object of this invention to improve the process of manufacturing aromatic aldehydes, whereby improved yields are obtained. It is a further object of my invention to provide an improved process of manufacturing aromatic aldehydes which may be applicable also to the conversion of the simpler aromatic compounds such as benzene, toluene or xylene.

Other and further objects of this invention will appear as the description proceeds.

I accomplish the objects of my invention by running the process substantially along the lines of the first mentioned procedure of Gattermann, but the amount of aluminum chloride employed is selected so that there is an excess of 0.5 moles of aluminum chloride for each mole of hydrocyanic acid employed. I also prefer to heat the mass to a higher temperature than Gattermann, during the step of entering hydrogen chloride.

It is my theory that if hydrochloric acid is absent, as in the first step of Gattermann's first procedure, the aluminum chloride reacts first with the hydrocyanic acid to form a complex addition compound of the formula $AlCl_3.2HCN$, until all the HCN is used up. After heating and feeding in hydrochloric acid, this intermediate decomposes, and after going through a series of further transient forms, finally attacks the aromatic compound forming an aryl amidine compound. The latter subsequently hydrolyzes, when treated with cold water containing mineral acid, to yield the desired aldehyde.

My improved process therefore consists of selecting the initial quantity of $AlCl_3$ so that, after exhaustion of the HCN in the mixture, there is still a quantity of free $AlCl_3$ left over in the mixture. Stated in different words, my improved process consists of forming first a mixture comprising the aromatic compound to be converted, a complex compound of the formula $AlCl_3.2HCN$, and free $AlCl_3$. This mixture is then heated to 60° C. or above, and hydrochloric acid gas is passed in until reaction ceases. The reaction mass is then treated with ice water containing acid to decompose the intermediate aryl complex and liberate the desired aryl aldehyde, in customary manner.

The invention is illustrated but not limited by the following examples, in which the parts are by weight.

Example I

Forty-four parts of cold dry benzene were mixed with 52 parts of dry aluminum chloride and 10.4 parts of anhydrous hydrogen cyanide were slowly added, with agitation. The mixture was heated to the boiling point under a reflux condenser while hydrogen chloride was passed through to saturation. The reaction mixture was then poured into a mixture of 400 parts of ice and 40 parts of hydrochloric acid (36° Tw.).

When interaction had ceased, the oily layer was removed by steam distillation or otherwise, and the aldehyde separated by fractional distillation or as its bisulfite compound. The yield was 4.2 parts. It will be noted that in this example the ratio of aluminum chloride to hydrogen cyanide is roughly equal to 1 mol. of AlCl₃ per 1 mol. of HCN. By using more aluminum chloride, e. g., 78 parts (roughly 1.5AlCl₃:1HCN) a yield of 7.0 parts was obtained.

*Example II*

Forty-four parts of toluene, 52 parts of anhydrous aluminum chloride, 10.4 parts of hydrogen cyanide and hydrogen chloride, as needed, were caused to interact as described in Example I, the temperature being kept at 100° C. during the time hydrogen chloride was being passed through. The yield of p-tolualdehyde was 23 parts.

Ortho-xylene, meta-xylene, para-xylene, mesitylene, and anisole similarly give excellent yields of the corresponding aldehydes. In like manner, halogenated aromatic hydrocarbons containing at least one alkyl radical (e. g., ortho-chlorotoluene, para-chlorotoluene, meta-chlorotoluene, chloroxylenes, and the like), or containing at least one halogen alkyl group (e. g., benzyl chloride, benzyl bromide, etc.), and alkylated dihydric or polyhydric phenols (e. g., o, m, and p dihydroxy benzene dimethyl ethers, pyrogallol dimethyl ether, pyrogallol trimethyl ether, phloroglucinol monomethyl ether, phloroglucinol dimethyl ether, phloroglucinol triethyl ether, phloroglucinol trimethyl ether, guiacol, creosole, and the like) yield aldehydes according to the invention. As further specific examples of compounds which may be converted to aldehydes in accordance with the invention may be mentioned ethylbenzene, isopropylbenzene, and the like. In general, the application of the invention is particularly desirable for the production of benzaldehyde from benzene and for the production of other aldehydes having an

group attached to a phenyl nucleus from compounds of the benzene series having as a substituent an aliphatic radical containing a single carbon atom, for instance, methyl, chloromethyl, methoxy, and the like.

Viewing the same facts from a different angle, it will be noted that the reaction above described is analogous to the well known Friedel-Crafts synthesis, and may indeed be considered as a special case thereof. The same view has been taken in the early literature on this subject (Gatterman et al., Berichte, vol. 30, page 1622, and vol. 31, pages 1149, 1765, and 1766). It is obvious, therefore, that my novel improvement may be applied to any aromatic compound which is capable of Friedel-Crafts synthesis with an alkyl group.

In practicing the invention, instead of hydrogen cyanide, a metallic cyanide, as, for example, zinc cyanide, sodium cyanide, potassium cyanide or the like, may be used in chemically equivalent proportions.

The invention is based on the discovery that by a proper choice of proportions and conditions, not only is the yield of aldehyde obtained by interaction of aromatic compounds of the kind in question with hydrocyanic and hydrochloric acids and aluminum chloride much improved, but benzene itself may be caused to interact to yield benzaldehyde.

The exact method of procedure is subject to some variation, particularly as regards specific proportions of the materials and conditions of reaction, such as temperature. In carrying the invention into practical effect, it is preferable to mix the cold dry aromatic hydrocarbon or derivative thereof with dry aluminum chloride, add the hydrogen cyanide, heat the mixture to the chosen temperature, and pass dry hydrogen chloride through it. After some time, cold water and an excess of hydrochloric acid are added and the aldehyde formed is separated. Other hydrolyzing agents, as, for example, sulfuric acid, or alkaline hydrolyzing agents such as sodium hydroxide may be used instead of hydrochloric acid to convert the aldimine to an aldehyde.

The aldehydes produced find a wide application in the chemical industry. A particular advantage of the invention lies in the higher yields obtainable and the direct conversion to an aldehyde of compounds such as benzene. On account of the relatively high yields obtainable and the ease of operation, the process provides a new commercially practicable route to a number of aldehydes of interest in the synthesis of dyes of the triarylmethane series.

As many apparently widely different embodiments of this invention may be made without departing from the spirit and scope thereof, it is to be understood that I do not limit myself to the specific embodiments thereof except as defined in the following claims.

I claim:

1. The process of producing benzaldehyde which comprises mixing about 44 parts of cold dry benzene with about 78 parts of dry aluminum chloride, slowly adding with agitation about 10.4 parts of anhydrous hydrogen cyanide, refluxing the mixture at its boiling temperature while passing through hydrogen chloride to saturation, adding an excess of cold water and hydrochloric acid to the completed reaction mixture, and separating the formed benzaldehyde.

2. In a process of producing benzenoid aldehydes by reacting a benzenoid compound having at least one free nuclear position with hydrogen cyanide, hydrochloric acid and aluminum chloride, the improvement which comprises mixing the aromatic compound with aluminum chloride and hydrogen cyanide at a temperature below 60° C., then heating to reflux temperature and feeding in dry hydrochloric acid, the molal ratio of AlCl₃ to HCN being not less than 1:2.

3. In a process for producing an aromatic aldehyde of the benzene series, the steps which comprise first forming a mixture of a benzenoid compound of the type normally capable of Friedel-Crafts synthesis, hydrogen cyanide, and aluminum chloride, the quantity of aluminum chloride being in excess of 0.5 moles for each mole of hydrogen cyanide employed, and then heating the mixture to reflux and passing in dry hydrogen chloride.

4. The process of producing an aromatic aldehyde of the benzene series, which comprises forming, at a temperature below 60° C., a mixture of a benzenoid hydrocarbon having at least one free position in the nucleus, hydrogen cyanide and aluminum chloride, the quantity of aluminum chloride being in excess of 0.5 moles per mole of the hydrogen cyanide employed, heating the mixture to reflux, passing in dry hydrogen chloride to saturation, and then decomposing the reaction mass in water containing acid and recovering the aldehyde formed in the reaction.

5. A process as in claim 8, the hydrocarbon being benzene.

6. A process as in claim 8, the hydrocarbon being a homolog of benzene.

7. A process as in claim 3, the benzenoid compound being benzene.

8. The process of producing an aromatic aldehyde of the benzene series, which comprises forming a mixture of a benzenoid hydrocarbon having at least one free position in the nucleus, hydrogen cyanide and aluminum chloride, the quantity of aluminum chloride being not less than 1 mole per mole of the hydrogen cyanide employed, heating the mixture to a temperature between 60° C. and reflux, passing in dry hydrogen chloride to saturation, and then decomposing the reaction mass in water containing acid and recovering the aldehyde formed in the reaction.

LEONARD ERIC HINKEL.